United States Patent
Jiang et al.

(10) Patent No.: US 11,143,513 B2
(45) Date of Patent: *Oct. 12, 2021

(54) LABELING SCHEME FOR LABELING AND GENERATING HIGH-DEFINITION MAP BASED ON TRAJECTORIES DRIVEN BY VEHICLES

(71) Applicant: Baidu USA LLC, Sunnyvale, CA (US)

(72) Inventors: Yifei Jiang, Sunnyvale, CA (US); Liangliang Zhang, Sunnyvale, CA (US); Dong Li, Sunnyvale, CA (US); Jiaming Tao, Sunnyvale, CA (US); Jiangtao Hu, Sunnyvale, CA (US)

(73) Assignee: BAIDU USA LLC, Sunnyvale, CA (US)

( * ) Notice: Subject to any disclaimer, the term of this patent is extended or adjusted under 35 U.S.C. 154(b) by 90 days.

This patent is subject to a terminal disclaimer.

(21) Appl. No.: 16/166,033

(22) Filed: Oct. 19, 2018

(65) Prior Publication Data

US 2020/0124423 A1    Apr. 23, 2020

(51) Int. Cl.
*G01C 21/32* (2006.01)
*G08G 1/01* (2006.01)
*G05D 1/00* (2006.01)

(52) U.S. Cl.
CPC .......... *G01C 21/32* (2013.01); *G05D 1/0088* (2013.01); *G08G 1/0112* (2013.01)

(58) Field of Classification Search
CPC .... G05D 1/021; G05D 1/0088; G05D 1/0044; G05D 2201/0213; H04W 4/40
See application file for complete search history.

(56) References Cited

U.S. PATENT DOCUMENTS

2018/0188044 A1* 7/2018 Wheeler ................. G06F 16/29
2018/0203453 A1* 7/2018 Hardy .............. G08G 1/096725

* cited by examiner

*Primary Examiner* — Yuen Wong
(74) *Attorney, Agent, or Firm* — Womble Bond Dickinson (US) LLP

(57) ABSTRACT

According to one embodiment, perception data describing a set of trajectories driven by a number of vehicles is received at a server from the vehicles or data collection agents over a network. The vehicles were driving through a road segment of a road over a period of time and their driving trajectories were captured. A trajectory analysis is the performed on the perception data using a set of rules to determine driving behaviors of the corresponding vehicles. A lane configuration of the road segment is then determined based on the driving behaviors. A map segment of a navigation map is then updated based on the lane configuration of one or more lanes within the road segment. A higher definition map can be generated based on the updates of the navigation map and the lane configuration, which can be utilized to autonomously drive an ADV subsequently.

17 Claims, 10 Drawing Sheets

LABELING SCHEME FOR LABELING AND GENERATING HIGH-DEFINITION MAP BASED ON TRAJECTORIES DRIVEN BY VEHICLES

TECHNICAL FIELD

Embodiments of the present disclosure relate generally to operating autonomous vehicles. More particularly, embodiments of the disclosure relate to generating a height-definition (HD) map based on trajectories driven by various vehicles over a period of time.

BACKGROUND

Vehicles operating in an autonomous mode (e.g., driverless) can relieve occupants, especially the driver, from some driving-related responsibilities. When operating in an autonomous mode, the vehicle can navigate to various locations using onboard sensors, allowing the vehicle to travel with minimal human interaction or in some cases without any passengers.

Motion planning and control are critical operations in autonomous driving. Typically, planning of autonomous driving relies heavily on the map information to guide an autonomous vehicle (ADV) without user intervention. A typical map such as a Google or Baidu map refers to as a navigation map that can be utilized to navigate from road to road. However, such a navigation map does not have more details such as lane configuration information. Thus, a navigation map is not sufficient enough for autonomous driving. In order to autonomously drive an ADV, a high-definition (HD) map is required, which includes lane configuration with roads. However, such an HD map may not be available at some time and it is generally expensive to generate and maintain an HD map.

BRIEF DESCRIPTION OF THE DRAWINGS

Embodiments of the disclosure are illustrated by way of example and not limitation in the figures of the accompanying drawings in which like references indicate similar elements.

DETAILED DESCRIPTION

Figure 1:
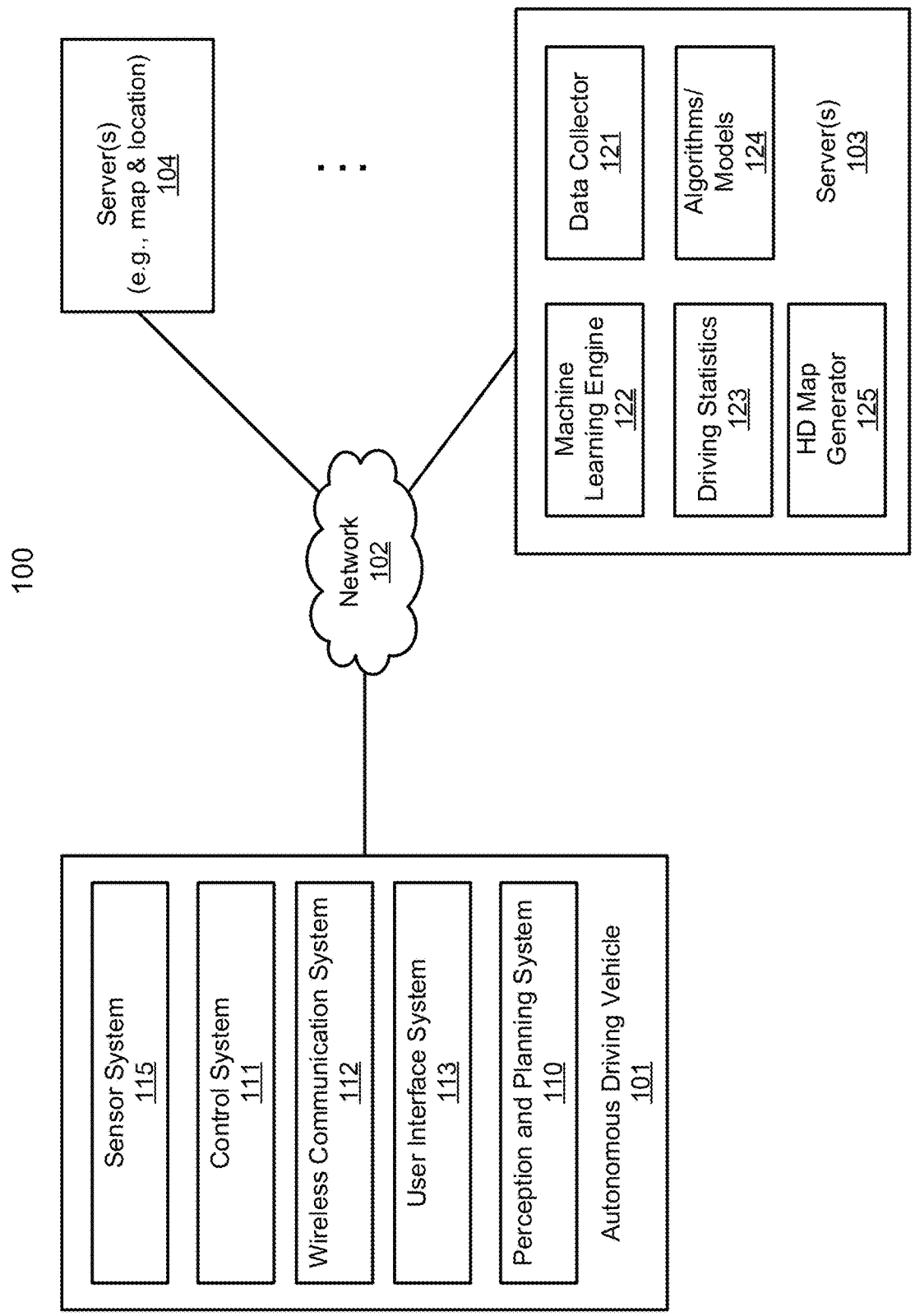
FIG. 1 is a block diagram illustrating a networked system according to one embodiment.

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

According to some embodiments, instead of maintaining and using an HD map, an autonomous driving system derives and determines lane configuration of a road based on the prior driving trajectories of a large amount of vehicles that drove through the road over a period of time in the past. By analyzing the driving trajectories, driving behaviors of the vehicles can be determined. Based on the driving behaviors, the lane configuration can be derived. The derived lane configuration in conjunction with a standard navigation map can be utilized as a higher definition map that includes at least some lane configuration of the roads. Such a higher definition map can be sufficient enough for the purpose of autonomous driving.

According to one embodiment, perception data describing a set of trajectories driven by a number of vehicles is received at a server from the vehicles or data collection agents over a network (e.g., cloud sourcing). The vehicles were driving through a road segment of a road over a period of time and their driving trajectories were observed and captured by one or more sensors such as a camera by another car (e.g., another ADV) or by itself (if the vehicle is an ADV or capable of recording its own driving trajectories. A trajectory analysis is the performed on the perception data using a set of rules to determine driving behaviors of the corresponding vehicles. A lane configuration of the road segment is then determined based on the driving behaviors. The lane configuration may include information identifying a number of lanes within the road segment and a lane width of each lane, etc. A map segment of a navigation map is then updated based on the lane configuration of one or more lanes within the road segment. As described above, a navigation map typically does not contain lane configuration information. A higher definition map can be generated based on the updates of the navigation map and the lane configuration. The higher definition map can be utilized to autonomously drive an ADV subsequently.

In one embodiment, the lane configuration can include a number of lanes within the road segment and a lane width for each of the lanes. The lane configuration can further include information identifying where the lane boundaries are. In one embodiment, based on the moving trajectories of the vehicles, an area (e.g., blocking area) can be identified in which no vehicle has driven through or cross lane. Based on this scenario, it can be determined that there must be a static obstacle located within the area that prevents the vehicles from driving through. Such a static obstacle may be a lane divider (e.g., center divide), a lane curb on the side, or a temporary construction area that does not show on an ordinary map. In addition, the size of the block area can be measured based on the trajectory and the static obstacle and its size can be indicated on the higher definition map.

Similarly, an intersection, a stop sign/stop line, or a traffic light can also be detected based on the driving behaviors derived from the trajectories of the vehicles.

FIG. 1 is a block diagram illustrating an autonomous vehicle network configuration according to one embodiment of the disclosure. Referring to FIG. 1, network configuration 100 includes autonomous vehicle 101 that may be communicatively coupled to one or more servers 103-104 over a network 102. Although there is one autonomous vehicle shown, multiple autonomous vehicles can be coupled to each other and/or coupled to servers 103-104 over network 102. Network 102 may be any type of networks such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) servers, or location servers, etc.

An autonomous vehicle refers to a vehicle that can be configured to in an autonomous mode in which the vehicle navigates through an environment with little or no input from a driver. Such an autonomous vehicle can include a sensor system having one or more sensors that are configured to detect information about the environment in which the vehicle operates. The vehicle and its associated controller(s) use the detected information to navigate through the environment. Autonomous vehicle 101 can operate in a manual mode, a full autonomous mode, or a partial autonomous mode.

In one embodiment, autonomous vehicle 101 includes, but is not limited to, perception and planning system 110, vehicle control system 111, wireless communication system 112, user interface system 113, infotainment system 114, and sensor system 115. Autonomous vehicle 101 may further include certain common components included in ordinary vehicles, such as, an engine, wheels, steering wheel, transmission, etc., which may be controlled by vehicle control system 111 and/or perception and planning system 110 using a variety of communication signals and/or commands, such as, for example, acceleration signals or commands, deceleration signals or commands, steering signals or commands, braking signals or commands, etc.

Components 110-115 may be communicatively coupled to each other via an interconnect, a bus, a network, or a combination thereof. For example, components 110-115 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 2:
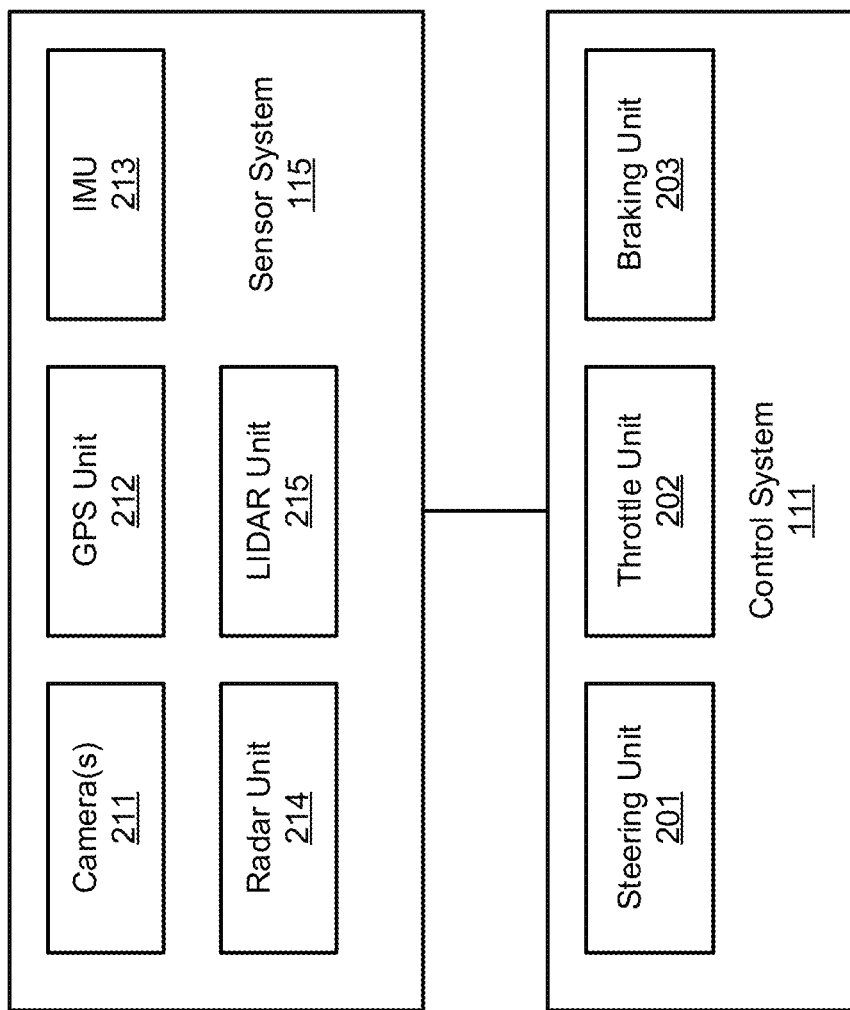
FIG. 2 is a block diagram illustrating an example of an autonomous vehicle according to one embodiment.

Referring now to FIG. 2, in one embodiment, sensor system 115 includes, but it is not limited to, one or more cameras 211, global positioning system (GPS) unit 212, inertial measurement unit (IMU) 213, radar unit 214, and a light detection and range (LIDAR) unit 215. GPS system 212 may include a transceiver operable to provide information regarding the position of the autonomous vehicle. IMU unit 213 may sense position and orientation changes of the autonomous vehicle based on inertial acceleration. Radar unit 214 may represent a system that utilizes radio signals to sense objects within the local environment of the autonomous vehicle. In some embodiments, in addition to sensing objects, radar unit 214 may additionally sense the speed and/or heading of the objects. LIDAR unit 215 may sense objects in the environment in which the autonomous vehicle is located using lasers. LIDAR unit 215 could include one or more laser sources, a laser scanner, and one or more detectors, among other system components. Cameras 211 may include one or more devices to capture images of the environment surrounding the autonomous vehicle. Cameras 211 may be still cameras and/or video cameras. A camera may be mechanically movable, for example, by mounting the camera on a rotating and/or tilting a platform.

Sensor system 115 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the autonomous vehicle. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

In one embodiment, vehicle control system 111 includes, but is not limited to, steering unit 201, throttle unit 202 (also referred to as an acceleration unit), and braking unit 203. Steering unit 201 is to adjust the direction or heading of the vehicle. Throttle unit 202 is to control the speed of the motor or engine that in turn control the speed and acceleration of the vehicle. Braking unit 203 is to decelerate the vehicle by providing friction to slow the wheels or tires of the vehicle. Note that the components as shown in FIG. 2 may be implemented in hardware, software, or a combination thereof.

Referring back to FIG. 1, wireless communication system 112 is to allow communication between autonomous vehicle 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using WiFi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyboard, a touch screen display device, a microphone, and a speaker, etc.

Some or all of the functions of autonomous vehicle 101 may be controlled or managed by perception and planning system 110, especially when operating in an autonomous driving mode. Perception and planning system 110 includes the necessary hardware (e.g., processor(s), memory, storage) and software (e.g., operating system, planning and routing programs) to receive information from sensor system 115, control system 111, wireless communication system 112, and/or user interface system 113, process the received information, plan a route or path from a starting point to a destination point, and then drive vehicle 101 based on the planning and control information. Alternatively, perception and planning system 110 may be integrated with vehicle control system 111.

For example, a user as a passenger may specify a starting location and a destination of a trip, for example, via a user interface. Perception and planning system 110 obtains the trip related data. For example, perception and planning system 110 may obtain location and route information from an MPOI server, which may be a part of servers 103-104. The location server provides location services and the MPOI server provides map services and the POIs of certain locations. Alternatively, such location and MPOI information may be cached locally in a persistent storage device of perception and planning system 110.

While autonomous vehicle 101 is moving along the route, perception and planning system 110 may also obtain real-time traffic information from a traffic information system or server (TIS). Note that servers 103-104 may be operated by a third party entity. Alternatively, the functionalities of servers 103-104 may be integrated with perception and planning system 110. Based on the real-time traffic information, MPOI information, and location information, as well as real-time local environment data detected or sensed by sensor system 115 (e.g., obstacles, objects, nearby vehicles), perception and planning system 110 can plan an optimal route and drive vehicle 101, for example, via control system 111, according to the planned route to reach the specified destination safely and efficiently.

Server 103 may be a data analytics system to perform data analytics services for a variety of clients. In one embodiment, data analytics system 103 includes data collector 121 and machine learning engine 122. Data collector 121 collects driving statistics 123 from a variety of vehicles, either autonomous vehicles or regular vehicles driven by human drivers. Driving statistics 123 include information indicating the driving commands (e.g., throttle, brake, steering commands) issued and responses of the vehicles (e.g., speeds, accelerations, decelerations, directions) captured by sensors of the vehicles at different points in time. Driving statistics 123 may further include information describing the driving environments at different points in time, such as, for example, routes (including starting and destination locations), MPOIs, road conditions, weather conditions, etc.

In addition, data collector 121 may further collect trajectories driven by a number of vehicles on a variety of roads, which may be perceived from a number of autonomous driving vehicles using their respective sensors. The trajectory information concerning the trajectories may be received from the autonomous driving vehicles over a network as a part of cloud sourcing data collection mechanism.

Based on driving statistics 123, machine learning engine 122 generates or trains a set of rules, algorithms, and/or predictive models 124 for a variety of purposes. In one embodiment, algorithms 124 may include the algorithms or models to detect or determine the driving behaviors of the vehicles and to derive the lane configuration based on the trajectories driven by the vehicles in the past. Algorithms 124 can then be utilized by map update module 125 to update a standard navigation map based on the analysis of the trajectory information to generate a higher definition map that is sufficient for autonomous driving. The higher definition map can be uploaded onto the autonomous driving vehicles for autonomous driving subsequently.

Figure 3A:
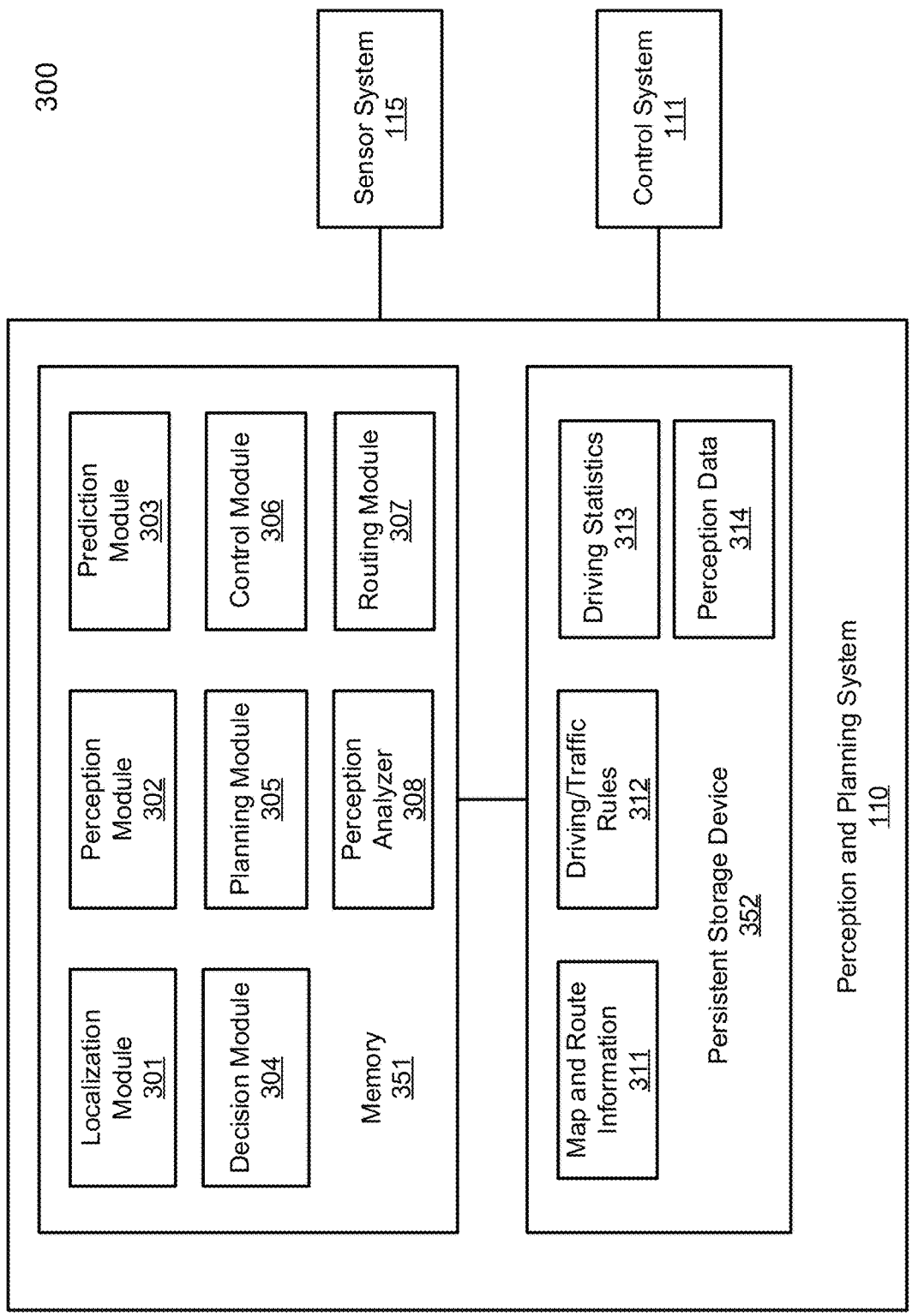
FIGS. 3A-3B are block diagrams illustrating an example of a perception and planning system used with an autonomous vehicle according to one embodiment.
Figure 3B:
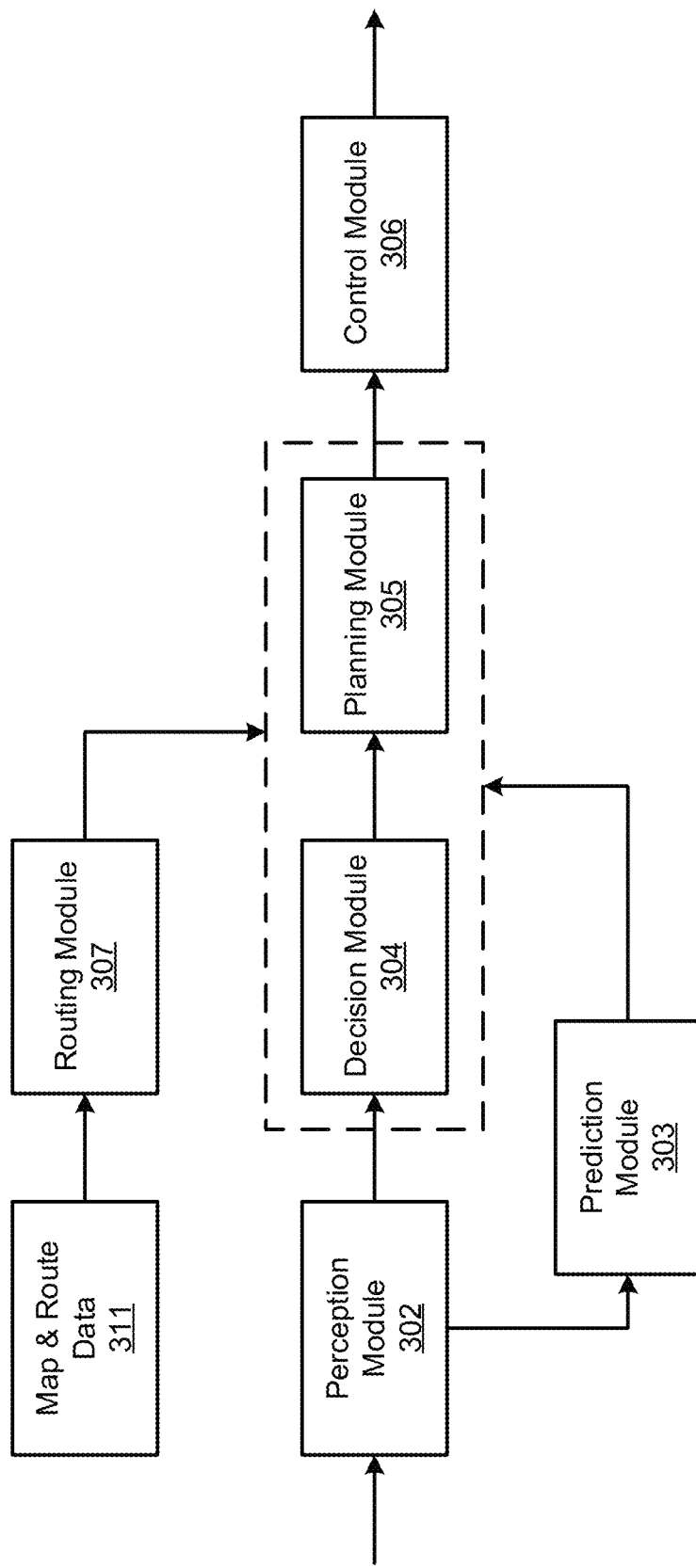

FIGS. 3A and 3B are block diagrams illustrating an example of a perception and planning system used with an autonomous vehicle according to one embodiment. System 300 may be implemented as a part of autonomous vehicle 101 of FIG. 1 including, but is not limited to, perception and planning system 110, control system 111, and sensor system 115. Referring to FIGS. 3A-3B, perception and planning system 110 includes, but is not limited to, localization module 301, perception module 302, prediction module 303, decision module 304, planning module 305, control module 306, routing module 307, and perception analyzer or analysis module 308.

Some or all of modules 301-308 may be implemented in software, hardware, or a combination thereof. For example, these modules may be installed in persistent storage device 352, loaded into memory 351, and executed by one or more processors (not shown). Note that some or all of these modules may be communicatively coupled to or integrated with some or all modules of vehicle control system 111 of FIG. 2. Some of modules 301-308 may be integrated together as an integrated module.

Localization module 301 determines a current location of autonomous vehicle 300 (e.g., leveraging GPS unit 212) and manages any data related to a trip or route of a user. Localization module 301 (also referred to as a map and route module) manages any data related to a trip or route of a user. A user may log in and specify a starting location and a destination of a trip, for example, via a user interface. Localization module 301 communicates with other components of autonomous vehicle 300, such as map and route information 311, to obtain the trip related data. For example, localization module 301 may obtain location and route information from a location server and a map and POI (MPOI) server. A location server provides location services and an MPOI server provides map services and the POIs of certain locations, which may be cached as part of map and route information 311. While autonomous vehicle 300 is moving along the route, localization module 301 may also obtain real-time traffic information from a traffic information system or server.

Based on the sensor data provided by sensor system 115 and localization information obtained by localization module 301, a perception of the surrounding environment is determined by perception module 302. The perception information may represent what an ordinary driver would perceive surrounding a vehicle in which the driver is driving. The perception can include the lane configuration, traffic light signals, a relative position of another vehicle, a pedestrian, a building, crosswalk, or other traffic related signs (e.g., stop signs/stop lines, yield signs), etc., for example, in a form of an object. The lane configuration includes information describing a lane or lanes, such as, for example, a shape of the lane (e.g., straight or curvature), a width of the lane, how many lanes in a road, one-way or two-way lane, merging or splitting lanes, exiting lane, etc.

Perception module 302 may include a computer vision system or functionalities of a computer vision system to process and analyze images captured by one or more cameras in order to identify objects and/or features in the environment of autonomous vehicle. The objects can include traffic signals, road way boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 302 can also detect objects based on other sensors data provided by other sensors such as a radar and/or LIDAR.

For each of the objects, prediction module 303 predicts what the object will behave under the circumstances. The prediction is performed based on the perception data perceiving the driving environment at the point in time in view of a set of map/rout information 311 and traffic rules 312. For example, if the object is a vehicle at an opposing direction and the current driving environment includes an intersection, prediction module 303 will predict whether the vehicle will likely move straight forward or make a turn. If the perception data indicates that the intersection has no traffic light, prediction module 303 may predict that the vehicle may have to fully stop prior to enter the intersection. If the perception data indicates that the vehicle is currently at a left-turn only lane or a right-turn only lane, prediction module 303 may predict that the vehicle will more likely make a left turn or right turn respectively.

For each of the objects, decision module 304 makes a decision regarding how to handle the object. For example, for a particular object (e.g., another vehicle in a crossing route) as well as its metadata describing the object (e.g., a speed, direction, turning angle), decision module 304 decides how to encounter the object (e.g., overtake, yield, stop, pass). Decision module 304 may make such decisions according to a set of rules such as traffic rules or driving rules 312, which may be stored in persistent storage device 352.

Routing module 307 is configured to provide one or more routes or paths from a starting point to a destination point. For a given trip from a start location to a destination location, for example, received from a user, routing module 307 obtains route and map information 311 and determines all possible routes or paths from the starting location to reach the destination location. Routing module 307 may generate a reference line in a form of a topographic map for each of the routes it determines from the starting location to reach the destination location. A reference line refers to an ideal route or path without any interference from others such as other vehicles, obstacles, or traffic condition. That is, if there is no other vehicle, pedestrians, or obstacles on the road, an ADV should exactly or closely follows the reference line. The topographic maps are then provided to decision module 304 and/or planning module 305. Decision module 304 and/or planning module 305 examine all of the possible routes to select and modify one of the most optimal routes in view of other data provided by other modules such as traffic conditions from localization module 301, driving environment perceived by perception module 302, and traffic condition predicted by prediction module 303. The actual path or route for controlling the ADV may be close to or different from the reference line provided by routing module 307 dependent upon the specific driving environment at the point in time.

Based on a decision for each of the objects perceived, planning module 305 plans a path or route for the autonomous vehicle, as well as driving parameters (e.g., distance, speed, and/or turning angle), using a reference line provided by routing module 307 as a basis. That is, for a given object, decision module 304 decides what to do with the object, while planning module 305 determines how to do it. For example, for a given object, decision module 304 may decide to pass the object, while planning module 305 may determine whether to pass on the left side or right side of the object. Planning and control data is generated by planning module 305 including information describing how vehicle 300 would move in a next moving cycle (e.g., next route/path segment). For example, the planning and control data may instruct vehicle 300 to move 10 meters at a speed of 30 mile per hour (mph), then change to a right lane at the speed of 25 mph.

Based on the planning and control data, control module 306 controls and drives the autonomous vehicle, by sending proper commands or signals to vehicle control system 111, according to a route or path defined by the planning and control data. The planning and control data include sufficient information to drive the vehicle from a first point to a second point of a route or path using appropriate vehicle settings or driving parameters (e.g., throttle, braking, steering commands) at different points in time along the path or route.

In one embodiment, the planning phase is performed in a number of planning cycles, also referred to as driving cycles, such as, for example, in every time interval of 100 milliseconds (ms). For each of the planning cycles or driving cycles, one or more control commands will be issued based on the planning and control data. That is, for every 100 ms, planning module 305 plans a next route segment or path segment, for example, including a target position and the time required for the ADV to reach the target position. Alternatively, planning module 305 may further specify the specific speed, direction, and/or steering angle, etc. In one embodiment, planning module 305 plans a route segment or path segment for the next predetermined period of time such as 5 seconds. For each planning cycle, planning module 305 plans a target position for the current cycle (e.g., next 5 seconds) based on a target position planned in a previous cycle. Control module 306 then generates one or more control commands (e.g., throttle, brake, steering control commands) based on the planning and control data of the current cycle.

Note that decision module 304 and planning module 305 may be integrated as an integrated module. Decision module 304/planning module 305 may include a navigation system or functionalities of a navigation system to determine a driving path for the autonomous vehicle. For example, the navigation system may determine a series of speeds and directional headings to affect movement of the autonomous vehicle along a path that substantially avoids perceived obstacles while generally advancing the autonomous vehicle along a roadway-based path leading to an ultimate destination. The destination may be set according to user inputs via user interface system 113. The navigation system may update the driving path dynamically while the autonomous vehicle is in operation. The navigation system can incorporate data from a GPS system and one or more maps so as to determine the driving path for the autonomous vehicle.

When ADV 300 drives around the roads, planning module 305 and control module 306 generates planning and control data to drive the vehicle autonomously. The planning and control data includes the trajectories such as paths, speeds, and heading directions at different points in time. The planning and control data will be stored as a part of driving statistics 313. In addition, in order to perceive a driving environment surrounding the vehicle, certain sensors (e.g., cameras) mounted on the vehicle are utilized to capture and/or predict other vehicles' movement. Such perception data captured by the sensors may also be stored as a part of perception data 314.

Figure 4:
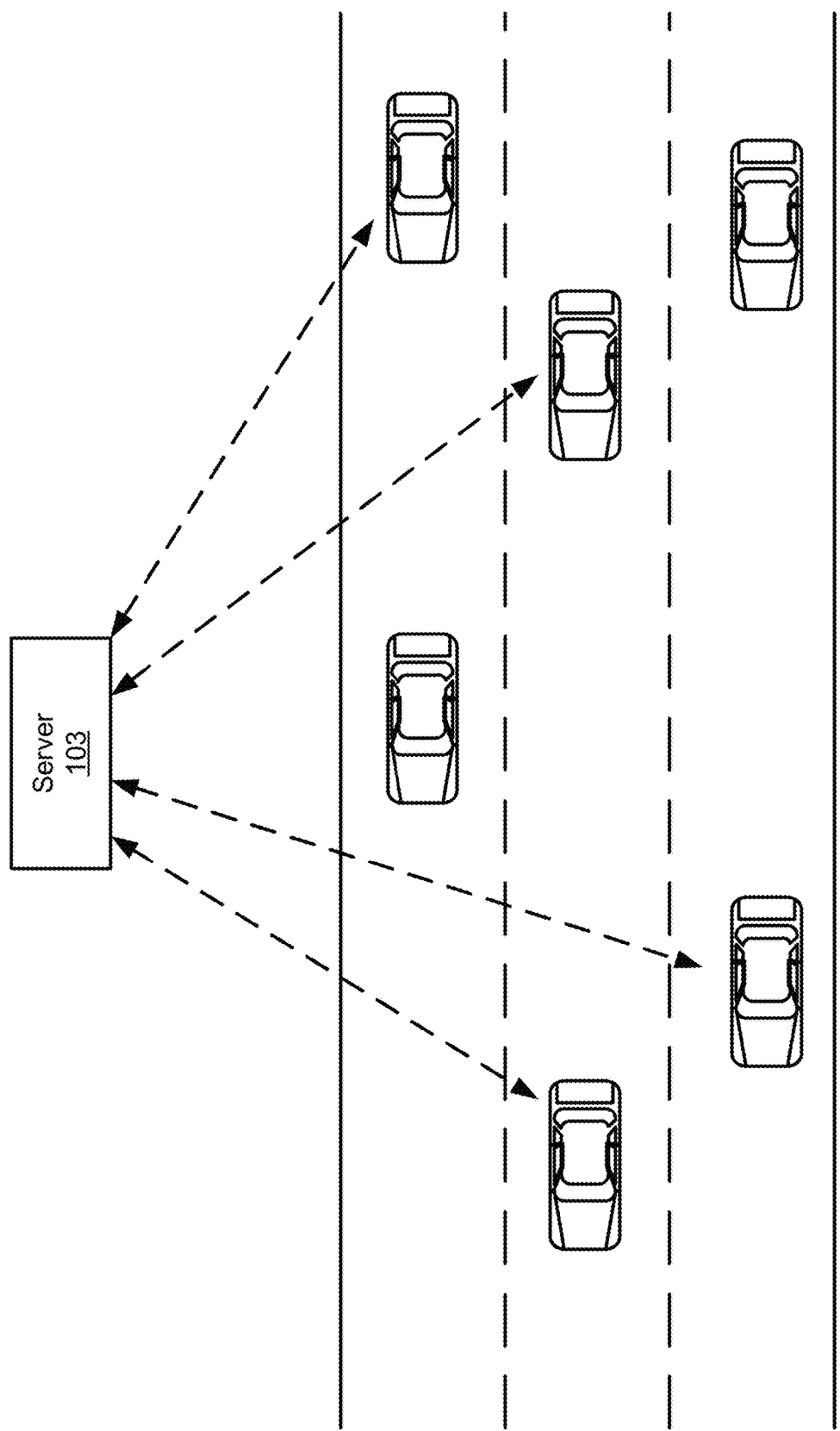
FIG. 4 is a block diagram illustrating a cloud sourcing autonomous driving data collection system according to one embodiment.

According to one embodiment, system 300 further includes perception data analyzer or data analysis module 308 configured to analyze driving statistics 313 and/or perception data 314 captured by sensors and/or perception module 302. Based on the analysis, the trajectories of other vehicles, as well as its own trajectories, navigating through a particular road or road segment can be sent to a remote centralized server. Perception data analyzer 308 may be implemented as a part of perception module 302 and/or planning module 305. Similarly, other ADVs may also collect such trajectories information of the vehicles driving through the roads may also send the trajectory information to the centralized server over a network dynamically or offline, as shown in FIG. 4. This configuration enables the server to analyze the trajectories of the vehicles driving through a particular road or road segment to determine the driving behaviors of the vehicles and based on the analysis, the server can determine the lane configuration of the road or road segment. The lane configuration may include a number of lanes within the road and the lane width of each lane, etc. The determined lane configuration can be combined with the ordinary navigation map to generate a higher definition map, which can be uploaded onto the vehicle and utilized for autonomous driving.

Figure 5:
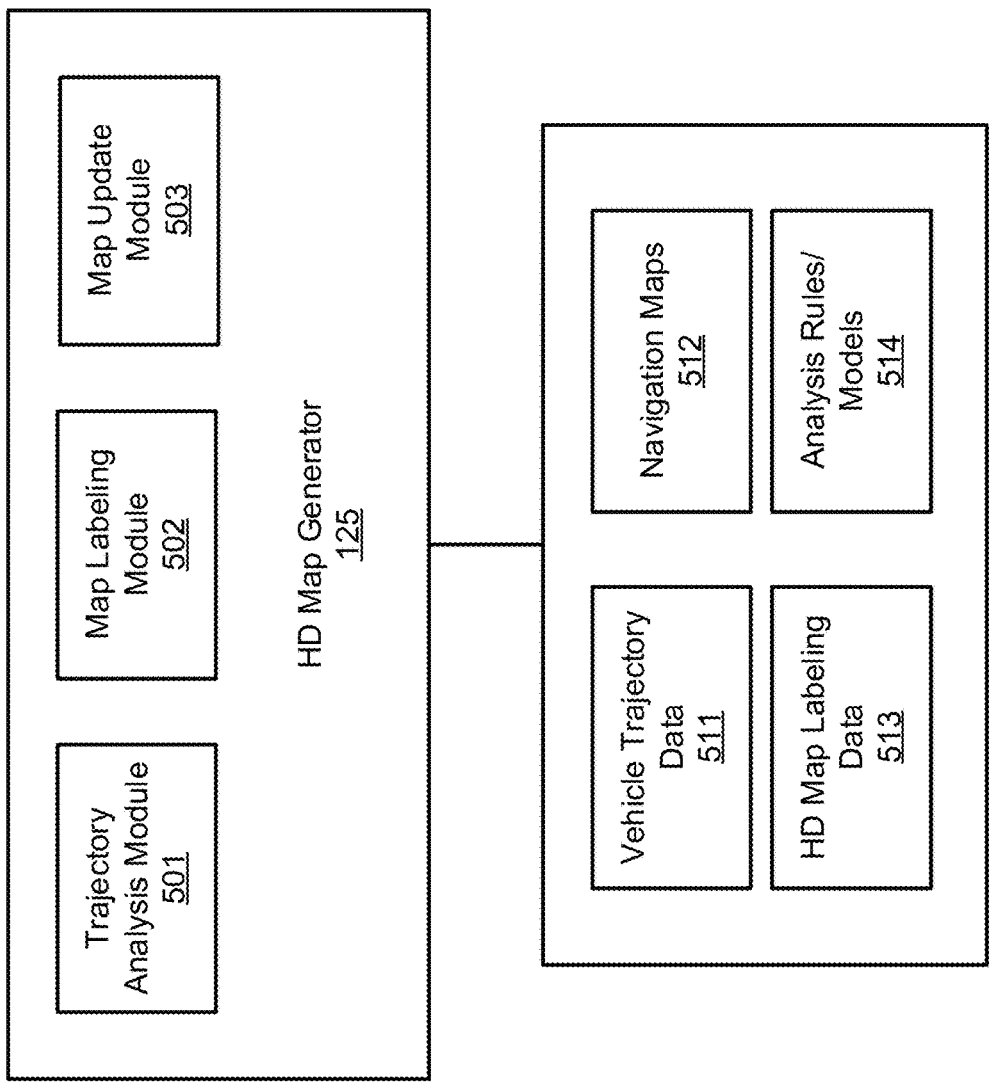
FIG. 5 is a block diagram illustrating a map generation system according to one embodiment.

FIG. 5 is a block diagram illustrating a high definition map generator according to one embodiment. Referring to FIG. 5, HD map generator 125 may be hosted by a server such as server 103 of FIG. 1. As shown in FIG. 1, server 103 includes data collector 121 to collect driving statistics 123 from a number of vehicles such as autonomous driving vehicles. In addition, data collector 121 further receives and collects trajectory information concerning the trajectories of other vehicles driving on the roads and perceived by at least some of the autonomous driving vehicles. The collected trajectory data may be stored in a persistent storage device as a part of vehicle trajectory data 511.

In one embodiment, HD map generator 125 includes, but is not limited to, trajectory analysis module 501, map labeling module 502, and map update module 503. Trajectory analysis module 501 is configured to perform an analysis on trajectory data 511. For example, for a given road segment, trajectory analysis module 501 identifies at least some of the trajectories 511 that are associated with the road segment, i.e., the trajectories upon which vehicles drove through the road segment. Trajectory data is utilized as an example of perception data collected from a number of autonomous driving vehicles that perceived the driving of other vehicles nearby. However, other types of data related to perception may also be applicable.

Figure 6:
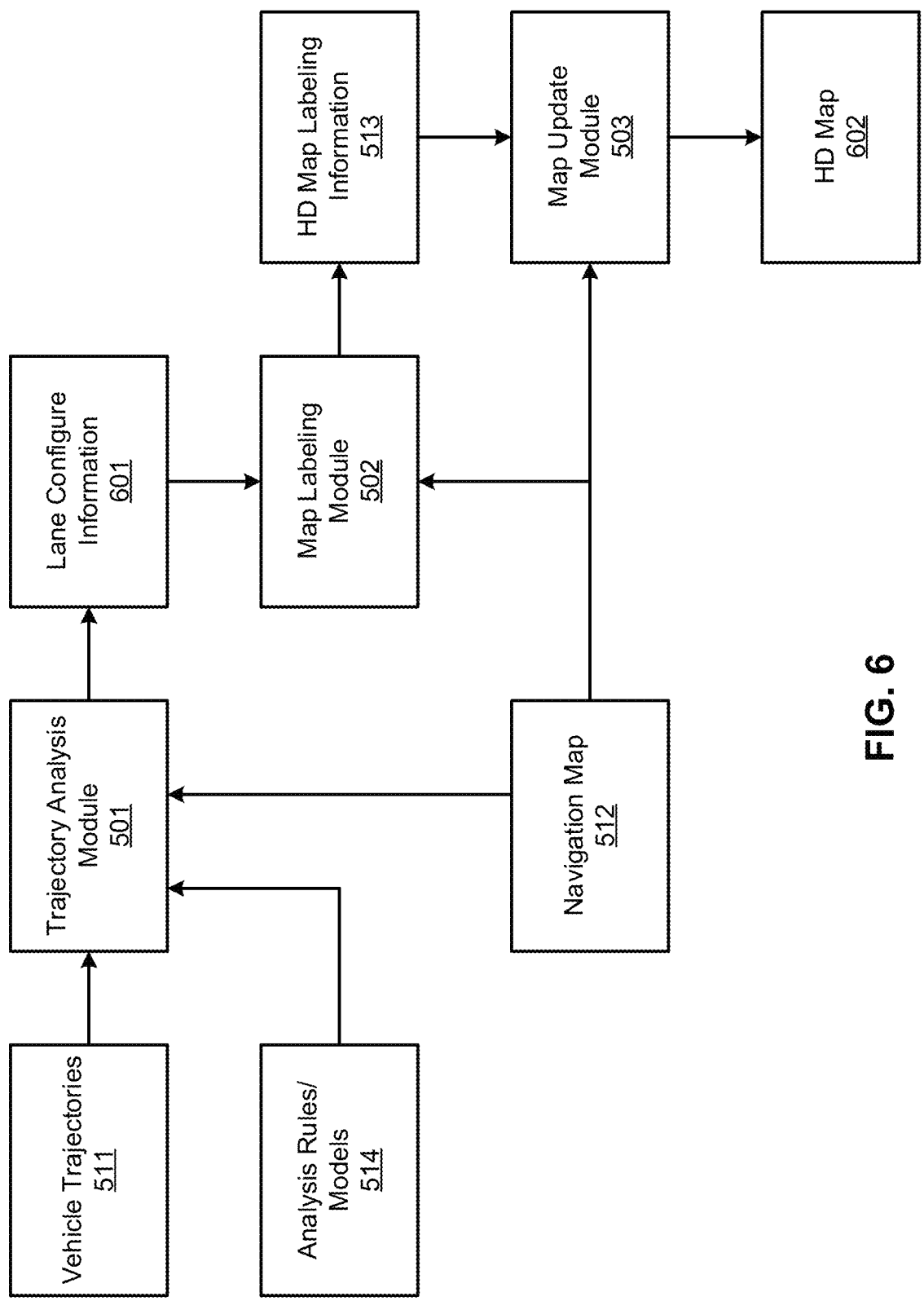
FIG. 6 is a flow diagram illustrating a processing flow of generating maps according to one embodiment.

According to one embodiment, referring now to FIGS. 5 and 6, trajectory analysis module 501 performs an analysis on trajectory data 511 to determine the driving behaviors of the associated vehicles within a particular road segment. Based on the driving behaviors, trajectory analysis module 501 determines the lane configuration 601 of the road segment using a set of analysis rules (or algorithms or models) 514. The lane configuration 601 may include a number of lanes with the road segment and a lane width of each of the lanes. The lane configuration may further include a stop line associated with a stop sign, which may be determined based on the driving behaviors of the vehicles in the road.

Figure 7:
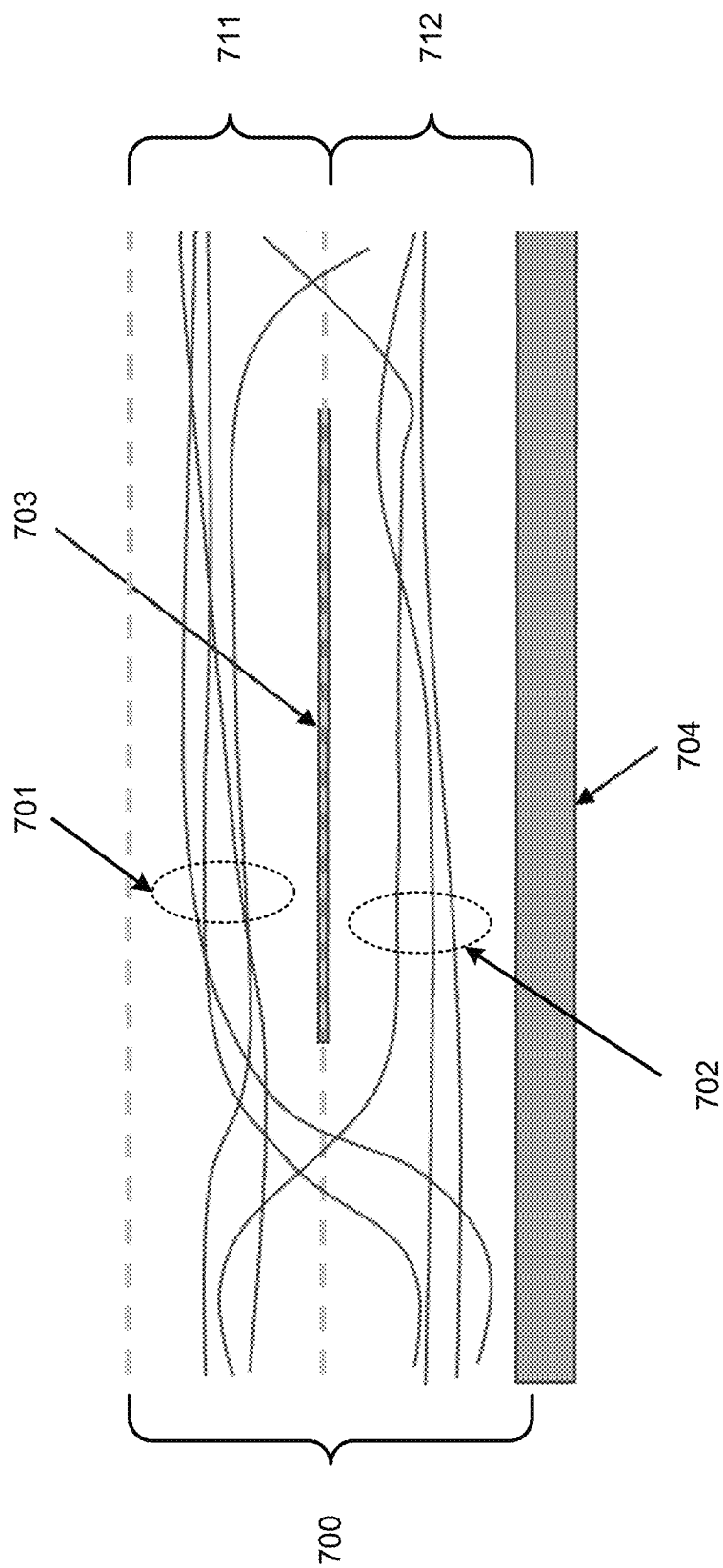
FIG. 7 shows an example of trajectories of vehicles in a road segment collected from the vehicles.

For example, referring now to FIG. 7, for a given road segment 700, there are trajectories of vehicles that have driven through the road segment 700 for a period of time. The trajectories may be received at a centralized server from a number of vehicles such as autonomous driving vehicles, where those vehicles perceive using their sensors (e.g., cameras) mounted on the vehicles how other vehicles traveled through the same road segment. They also captured using their sensors the trajectories of other vehicles driving through the road segment. The captured trajectories are transmitted to the centralized server in a form of trajectory metadata describing the trajectories after certain processing, for example, as a part of trajectory data 511 stored at the server. Alternatively, the processing of trajectories may be performed at the centralizer server, in which the vehicles may simply transmit the images of the perceived environment to the server. But such a configuration may require a higher network bandwidth and larger storage space.

Based on trajectory data 511, the trajectories are projected onto a standard navigation map, for example, based on their GPS coordinates. The trajectory analysis module 501 then performs an analysis to determine the driving behaviors of the associated vehicles using a set of rules 514. Prior to the performing the analysis, certain trajectories that are abnormal may be removed from being considered. In addition, a smoothing operation may be performed to smooth the shapes of the trajectories. Referring to FIG. 7, analysis module 501 can detect in this example a first set of trajectories 701 and a second set of trajectories 702 within road segment 700. Based on the majority of the trajectories in two sets are split into two main streams, it can be inferred using the set of analysis rules that there may be two lanes within road 700, i.e., lanes 711-712.

In addition, according to one embodiment, the lane width of each lane may also be determined, for example by evenly dividing the detected lanes. Furthermore, a lane boundary of a most left or most right lane can be determined, for example, by measuring the trajectories. For example, by measuring the locations of the most left and most right points of the trajectories, the lane boundary (e.g., lane boundary 704) can be derived by adding a buffer or margin on the top. Further, based on the driving behaviors in this example, the system may detect that there is no lane changing around area 703. That is, no vehicle has changed lanes in area 703. Thus, there must be a static object such as a lane divider that may have prevented any vehicle from crossing over. Such an area can be indicated that no lane changing is allowed on the map. On the other hand, the lane changeable area can also be labeled around the non-changeable area based on the trajectories by adding sufficient buffer areas surrounding.

Similarly, an intersection of the road segment can also be detected based on the trajectories. For example, if there are some trajectories turning left or right at a particular location of the road, while some other trajectories go straight, it can be reasonably assumed that there may be an intersection there. In another example, if an image captured by a camera shows a pedestrian while the trajectories show that most or all of the vehicles stop at that location, it can reasonably assumed there may be a pedestrian crosswalk there. In further example, if the system detects that most or all of the vehicles stop at a particular location for several seconds and then restart to move, it can be reasonably assumed that there may be a stop line or stop sign at the location. Such findings can be recorded as a part of lane configuration information 601.

Based on the lane configuration 601, map labeling module 502 generates HD map label information 513 in view of the navigation map 512. The HD map label information 602 includes information to be labeled or added to a specific location of the standard navigation map 512 by map update module 503 to generate an HD map 602. Alternatively, HD map label information 513 can be maintained as a separate layer, which can be utilized in conjunction with navigation map 512 as a part of a higher definition map for autonomous driving. The generated HD map can then be uploaded onto the autonomous driving vehicles to be utilized for autonomous driving at real-time.

As described above, a typical navigation map does not include lane configuration of a road. Rather, a navigation map only contains road level information such as the speed limit of the road, whether the road is a highway or a local road, etc. The HD map labeling scheme described through this application can be utilized to label and add additional lane information on the navigation map to generate an HD map. Although such an HD map may not as good as a standard HD map, it may contain sufficient lane configuration information for autonomous driving. When labeling a navigation map, a road may be segmented based on the speed limit provided by the navigation map and lane configuration may be labeled on a road segment basis.

Figure 8:
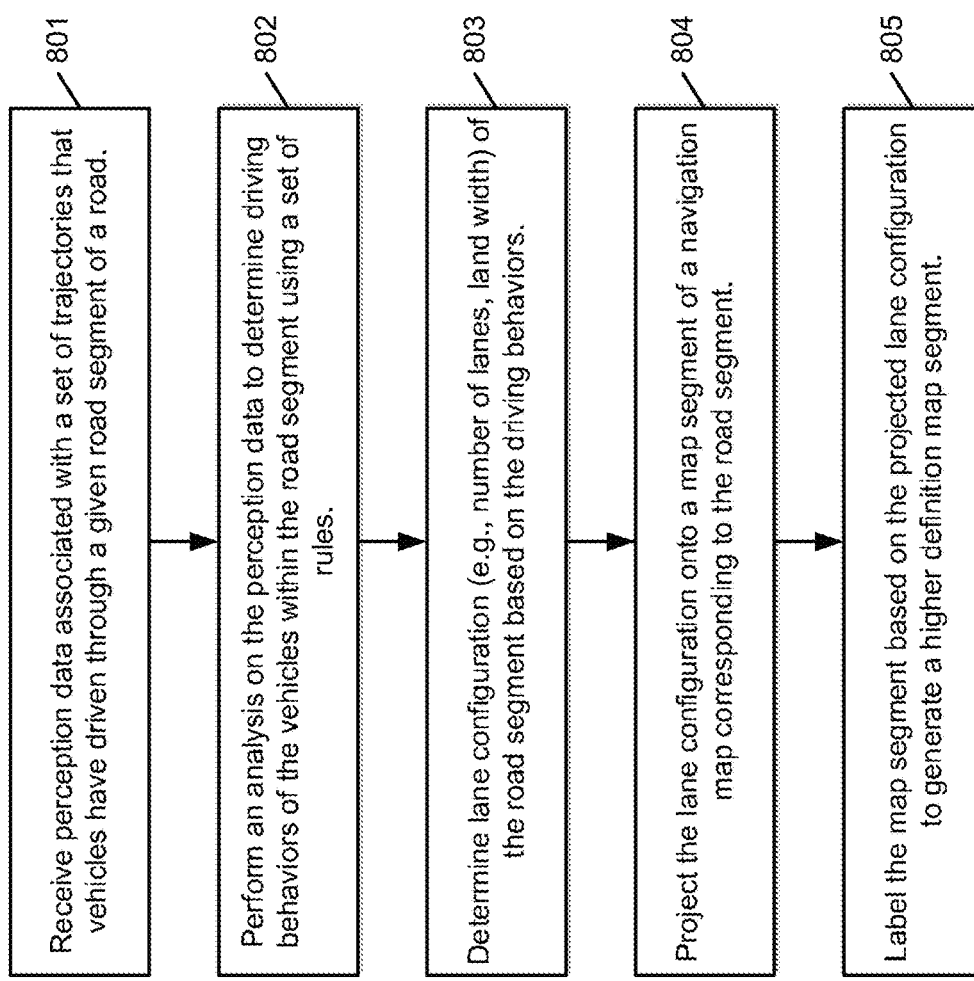
FIG. 8 is a flow diagram illustrating a process of generating a higher definition map according to one embodiment.

FIG. 8 is a flow diagram illustrating a process of generating a high definition map based on prior trajectories according to one embodiment. Process 800 may be performed by processing logic which may include software, hardware, or a combination thereof. For example, process 800 may be performed by HD map generator 125. Referring to FIG. 8, in operation 801, processing logic receives perception data representing a set of trajectories that a number of vehicles have driven through a given road segment of a road. In operation 802, processing logic performs an analysis on the perception data to determine driving behaviors of the vehicles within the road segment using a set of rules (e.g., traffic rules or machine predictive models). In operation 803, processing logic determines lane configuration of the road segment based on the driving behaviors of the vehicles. In operation 804, the lane configuration information is projected onto a map segment of a standard navigation map corresponding to the road segment, for example, based on the corresponding location information. In operation 805, the map segment of the navigation map is labeled based on the lane configuration information, for example, by adding additional lane configuration data or map metadata onto the navigation map to generate a higher definition map.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 9:
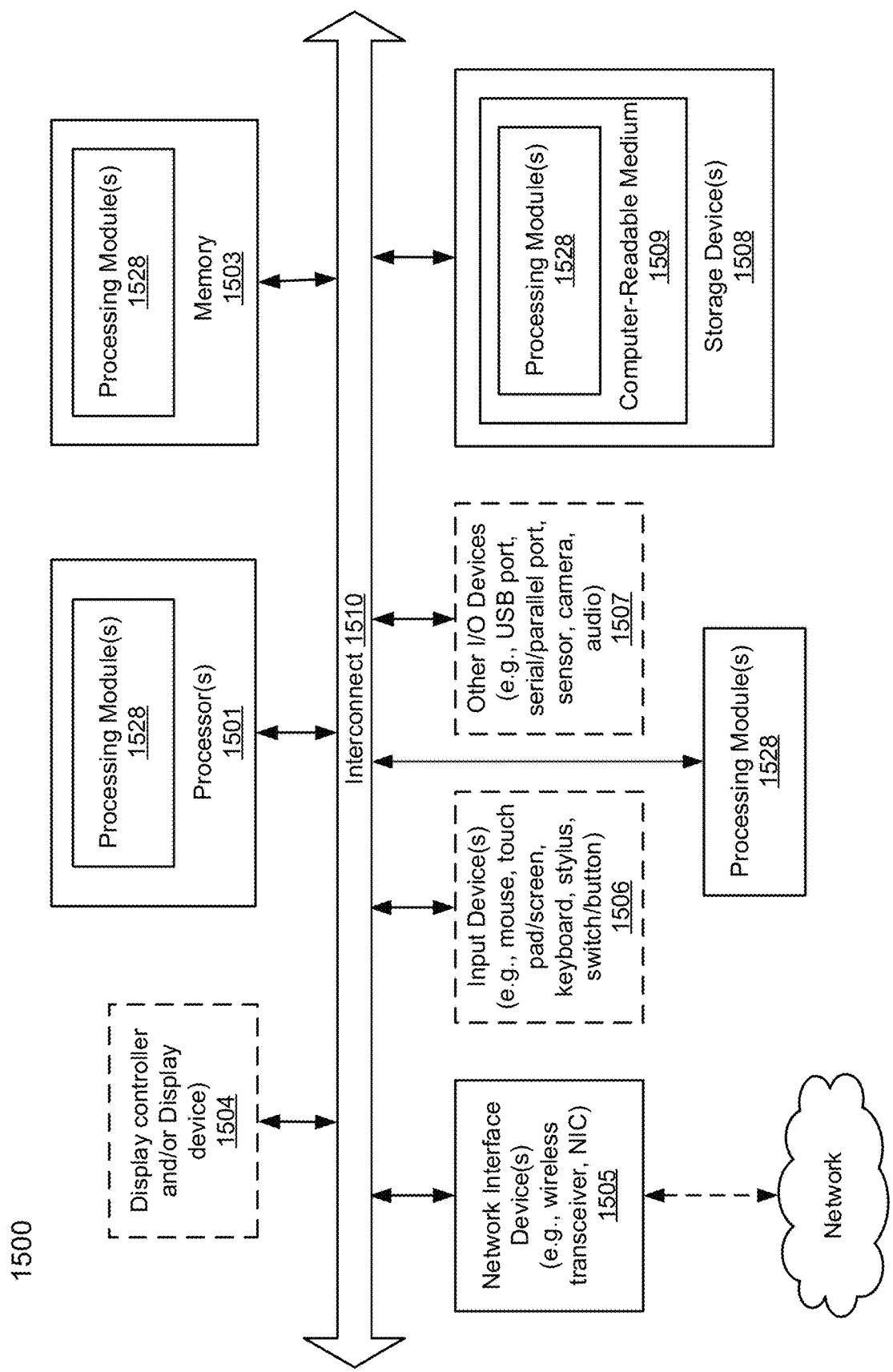
FIG. 9 is a block diagram illustrating a data processing system according to one embodiment.

FIG. 9 is a block diagram illustrating an example of a data processing system which may be used with one embodiment of the disclosure. For example, system 1500 may represent any of data processing systems described above performing any of the processes or methods described above, such as, for example, perception and planning system 110 or any of servers 103-104 of FIG. 1. System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system.

Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a Smartwatch, a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 connected via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Robot Operating System (ROS), Windows® operating system from Microsoft®, Mac OS®/iOS® from Apple, Android® from Google®, LINUX, UNIX, or other real-time or embedded operating systems.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including BIOS as well as other firmware of the system.

Storage device 1508 may include computer-accessible storage medium 1509 (also known as a machine-readable storage medium or a computer-readable medium) on which is stored one or more sets of instructions or software (e.g., module, unit, and/or logic 1528) embodying any one or more of the methodologies or functions described herein. Processing module/unit/logic 1528 may represent any of the components described above, such as, for example, planning module 305, control module 306, or HD map generator 125. Processing module/unit/logic 1528 may also reside, completely or at least partially, within memory 1503 and/or within processor 1501 during execution thereof by data processing system 1500, memory 1503 and processor 1501 also constituting machine-accessible storage media. Processing module/unit/logic 1528 may further be transmitted or received over a network via network interface device 1505.

Computer-readable storage medium 1509 may also be used to store the some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present disclosure. The term "computer-readable storage medium" shall accordingly be taken to include, but not be limited to, solid-state memories, and optical and magnetic media, or any other non-transitory machine-readable medium.

Processing module/unit/logic 1528, components and other features described herein can be implemented as discrete hardware components or integrated in the functionality of hardware components such as ASICS, FPGAs, DSPs or similar devices. In addition, processing module/unit/logic 1528 can be implemented as firmware or functional circuitry within hardware devices. Further, processing module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present disclosure. It will also be appreciated that network computers, handheld computers, mobile phones, servers, and/or other data processing systems which have fewer components or perhaps more components may also be used with embodiments of the disclosure.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A computer-implemented method for generating a map for autonomous driving, the method comprising:
 receiving perception data describing a set of trajectories driven by a plurality of vehicles navigating through a road segment of a road over a period of time;
 performing an analysis using a set of rules on the set of trajectories to determine driving behaviors of the plurality of vehicles;
 determining a lane configuration of one or more lanes of the road segment based on the driving behaviors of the plurality of vehicles, comprising:
  determining a number of lanes within the road segment based on the driving behaviors of the plurality of vehicles within the road segment; and
  for each of the lanes, determining a lane width based on trajectory patterns of a plurality of trajectories within the lane;
 labelling a map segment of a navigation map corresponding to the road segment to include lane configuration information of the one or more lanes to generate a higher definition (HD) map, wherein the lane configuration information includes the number of lanes and the lane width of each lane, wherein the HD map is utilized to generate a path to autonomously drive an autonomous driving vehicle subsequently; and
 transferring the HD map to the autonomous driving vehicle to enable controlling the autonomous driving vehicle to travel on the road segment according to the path generated based on the HD map.

2. The method of claim 1, further comprising measuring a lane boundary of each lane based on the plurality of trajectories, wherein the lane configuration information includes the lane boundary of each lane.

3. The method of claim 1, wherein determining the lane configuration of one or more lanes of the road segment comprises:
 identifying an area that the plurality of vehicles drove to avoid based on the driving behaviors; and determining that a static obstacle is located within the avoided area based on the set of rules.

4. The method of claim 3, further comprising measuring a size of the avoided area based on the plurality of trajectories near the avoided area, wherein the size of the avoided area is included in the HD map.

5. The method of claim 1, wherein determining the lane configuration of one or more lanes of the road segment comprises detecting an intersection based on the plurality of trajectories of the plurality of vehicles.

6. The method of claim 1, wherein determining the lane configuration of one or more lanes of the road segment comprises detecting a stop sign or a stop line based on the plurality of trajectories of the plurality of vehicles.

7. The method of claim 1, wherein determining the lane configuration of one or more lanes of the road segment comprises detecting a traffic light based on the perception data.

8. A non-transitory machine-readable medium having instructions stored therein, which when executed by a processor, cause the processor to perform operations, the operations comprising:
 receiving perception data describing a set of trajectories driven by a plurality of vehicles navigating through a road segment of a road over a period of time;
 performing an analysis using a set of rules on the set of trajectories to determine driving behaviors of the plurality of vehicles;
 determining a lane configuration of one or more lanes of the road segment based on the driving behaviors of the plurality of vehicles, comprising:
  determining a number of lanes within the road segment based on the driving behaviors of the plurality of vehicles within the road segment; and
  for each of the lanes, determining a lane width based on trajectory patterns of a plurality of trajectories within the lane;
 labelling a map segment of a navigation map corresponding to the road segment to include lane configuration information of the one or more lanes to generate a higher definition (HD) map, wherein the lane configuration information inlcudes the number of lanes and the lane width of each lane, wherein the HD map is utilized to generate a path to autonomously drive an autonomous driving vehicle subsequently; and
 transferring the HD map to the autonomous driving vehicle to enable controlling the autonomous driving vehicle to travel on the road segment according to the path generated based on the HD map.

9. The machine-readable medium of claim 8, wherein the operation further comprise measuring a lane boundary of each lane based on the plurality of trajectories, wherein the lane configuration information includes the lane boundary of each lane.

10. The machine-readable medium of claim 8, wherein determining the lane configuration of one or more lanes of the road segment comprises:
 identifying an area that the plurality of vehicles drove to avoid based on the driving behaviors; and
 determining that a static obstacle is located within the avoided area based on the set of rules.

11. The machine-readable medium of claim 10, wherein the operations further comprise measuring a size of the avoided area based on the plurality of trajectories near the avoided area, wherein the size of the avoided area is included in the HD map.

12. The machine-readable medium of claim 8, wherein determining the lane configuration of one or more lanes of the road segment comprises detecting an intersection based on the plurality of trajectories of the plurality of vehicles.

13. The machine-readable medium of claim 8, wherein determining the lane configuration of one or more lanes of the road segment comprises detecting a stop sign or a stop line based on the plurality of trajectories of the plurality of vehicles.

14. The machine-readable medium of claim 8, wherein determining the lane configuration of one or more lanes of the road segment comprises detecting a traffic light based on the perception data.

15. A data processing system, comprising:
a processor; and
a memory coupled to the processor to store instructions, which when executed by the processor, cause the processor to perform operations, the operations including:
receiving perception data describing a set of trajectories driven by a plurality of vehicles navigating through a road segment of a road over a period of time,
performing an analysis using a set of rules on the set of trajectories to determine driving behaviors of the plurality of vehicles,
determining a lane configuration of one or more lanes of the road segment based on the driving behaviors of the plurality of vehicles, comprising:
determining a number of lanes within the road segment based on the driving behaviors of the plurality of vehicles within the road segment; and
for each of the lanes, determining a lane width based on trajectory patterns of a plurality of trajectories within the lane,
updating a map segment of a navigation map corresponding to the road segment to include lane configuration information of the one or more lanes togenerate a higher definition (HD) map, wherein the lane configuration information includes the number of lanes and the lane width of each lane, wherein the HD map is utilized to generate a path to autonomously drive an autonomous driving vehicle subsequently; and
transferring the HD map to the autonomous driving vehicle to enable controlling the autonomous driving vehicle to travel on the road segment according to the path generated based on the HD map.

16. The system of claim 15, wherein the operation further comprise measuring a lane boundary of each lane based on the plurality of trajectories, wherein the lane configuration information includes the lane boundary of each lane.

17. The system of claim 15, wherein determining the lane configuration of one or more lanes of the road segment comprises:
identifying an area that the plurality of vehicles drove to avoid based on the driving behaviors; and
determining that a static obstacle is located within the avoided area based on the set of rules.

* * * * *